(12) United States Patent
Limaye

(10) Patent No.: US 11,320,877 B2
(45) Date of Patent: *May 3, 2022

(54) INTEGRATED CIRCUIT THERMAL THROTTLING WITH WORKLOAD ADAPTED THERMAL SENSOR MAXIMUM TEMPERATURE

(71) Applicant: Intel Corporation, Santa Clara, CA (US)

(72) Inventor: Ameya Limaye, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,402

(22) Filed: Jul. 10, 2020

(65) Prior Publication Data

US 2020/0401199 A1 Dec. 24, 2020

Related U.S. Application Data

(63) Continuation of application No. 14/975,356, filed on Dec. 18, 2015, now Pat. No. 10,712,789.

(51) Int. Cl.
  *G06F 1/32* (2019.01)
  *G06F 1/20* (2006.01)
  *G06F 1/324* (2019.01)

(52) U.S. Cl.
  CPC .............. *G06F 1/206* (2013.01); *G06F 1/203* (2013.01); *G06F 1/324* (2013.01); *Y02D 10/00* (2018.01)

(58) Field of Classification Search
  CPC ..... G06F 1/32; G06F 1/12; G06F 1/26; G06F 9/44
  See application file for complete search history.

(56) References Cited

U.S. PATENT DOCUMENTS

| 7,337,339 B1 | 2/2008 | Choquette et al. |
| 7,590,473 B2 | 9/2009 | Wyatt |
| (Continued) | | |

FOREIGN PATENT DOCUMENTS

| KR | 1020070104711 | 10/2007 |
| WO | 2007024403 | 3/2007 |

OTHER PUBLICATIONS

Non-Final Office Action dated Feb. 3, 2021 for Chinese Patent Application No. 201680069172.1.

(Continued)

*Primary Examiner* — Keshab R Pandey
(74) *Attorney, Agent, or Firm* — Schwabe, Williamson & Wyatt, P.C.

(57) ABSTRACT

A method and apparatus for integrated circuit (IC) thermal throttling is described. In one embodiment, the apparatus comprises a plurality of thermal sensors, each of the plurality of thermal sensors being located in an area in the IC to record a die temperature at a location in its associated area; and a thermal controller coupled to the plurality of thermal sensors to perform thermal throttling of the IC to reduce the temperature of the IC in response to the die temperature recorded by any one temperature sensors of the plurality of thermal sensors being greater than an individual temperature threshold for said any one temperature sensor, the individual temperature threshold for each temperature sensor being (Continued)

based on a maximum temperature allowed for the area in the IC in which said each thermal sensor is located and power supplied to a plurality of areas of the IC.

22 Claims, 4 Drawing Sheets

(56) References Cited

U.S. PATENT DOCUMENTS

| | | | |
|---|---|---|---|
| 8,037,445 B2 | 10/2011 | Poirier et al. | |
| 2006/0161373 A1 | 7/2006 | Mangrulkar et al. | |
| 2007/0124622 A1 | 5/2007 | Johns et al. | |
| 2008/0043807 A1* | 2/2008 | Yazawa | G06F 1/206 |
| | | | 374/141 |
| 2010/0213919 A1 | 8/2010 | Takayanagi et al. | |
| 2012/0166839 A1 | 6/2012 | Sodhi et al. | |
| 2013/0090888 A1* | 4/2013 | Anderson | G06F 1/203 |
| | | | 702/130 |
| 2013/0246820 A1 | 9/2013 | Branover et al. | |
| 2014/0022003 A1 | 1/2014 | Inoue et al. | |
| 2014/0122917 A1* | 5/2014 | Chung | G06F 1/206 |
| | | | 713/600 |
| 2015/0046012 A1* | 2/2015 | Chen | B60L 11/1872 |
| | | | 701/22 |
| 2015/0277520 A1 | 10/2015 | Neumann | |
| 2016/0109491 A1 | 4/2016 | Kann | |

OTHER PUBLICATIONS

Advisory Action dated Dec. 12, 2017 for U.S. Appl. No. 14/975,356.
Exam Report dated Sep. 17, 2020 for EP Patent Application No. 16876222.7.
Final Office Action dated Aug. 28, 2017 for U.S. Appl. No. 14/975,356.
International Preliminary Report on Patentability dated Jun. 19, 2019 for PCT Patent Application No. PCT/US2016/057025.
Non-Final Office Action dated Dec. 30, 2016 for U.S. Appl. No. 14/975,356.
Non-Final Office Action dated Oct. 7, 2019 for U.S. Appl. No. 14/975,356.
Notice of Allowance dated Mar. 23, 2020 for U.S. Appl. No. 14/975,356.
Supplementary European Search Report & Search Opinion dated Jul. 4, 2019 for EP Patent Application No. 16876222.7.
Rotem et al., "Temperature Measurement in the Intel® CoreTM Duo Processor", Proceedings of the 12th International Workshop on Thermal Investigations of ICs, HERMINIC 2006, Sep. 12, 2007, 5 pages.

* cited by examiner

INTEGRATED CIRCUIT THERMAL THROTTLING WITH WORKLOAD ADAPTED THERMAL SENSOR MAXIMUM TEMPERATURE

CLAIM OF PRIORITY

This application is a continuation of, and claims the benefit of priority to U.S. patent application Ser. No. 14/975,356, filed on Dec. 18, 2015, now issued as U.S. Pat. No. 10,712,789, on Jul. 14, 2020, and titled "INTEGRATED CIRCUIT THERMAL THROTTLING WITH WORKLOAD ADAPTED THERMAL SENSOR MAXIMUM TEMPERATURE", and which is incorporated by reference in entirety.

FIELD OF THE INVENTION

This disclosure pertains to energy efficiency and energy conservation in integrated circuits and in particular but not exclusively, to the field of thermal control of computing device processors. More particularly, embodiments of the invention relate to energy efficient and energy conserving thermal throttling of electronic device processors.

BACKGROUND

Advances in semi-conductor processing and logic design have permitted an increase in the amount of logic that may be present on integrated circuit (IC) devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. As a result, there is a vital need for energy efficiency and conservation associated with integrated circuits.

As the trend toward advanced microprocessors with more transistors and higher frequencies continues to grow, computer designers and manufacturers are often faced with corresponding increases in power and thermal consumption. Particularly in computing devices, processor power consumption can lead to overheating, which may negatively affect performance, damage components (e.g., the processor), cause discomfort or injury to the user, and can significantly reduce battery life.

Some processors and SoCs (System-on-a-Chip) are enabled with Intel® Thermal Monitor, which is a feature that activates a Thermal Control Circuit (TCC) to reduce power and maintain die temperatures within product limits. The TCC reduces power by either frequency/voltage reduction or clock modulation (both of which are considered throttling herein). This feature relies on multiple on-die Digital Thermal Sensors (DTS) to monitor real-time die temperatures for TCC activation decisions. Since each DTS cannot be located exactly at a die hotspot, there is an offset between the temperature of the hot spot and the temperature measured by the DTS close to it. This hotspot-to-DTS temperature offset is obtained by thermal modeling and is used to determine the maximum DTS temperature limit that would trigger TCC activation. Currently, the die hotpot-to-DTS temperature offset is calculated by modeling the worst case TDP workload power map and is hardcoded into the throttling algorithm. Consequently, the TCC will be accurately activated only for the workload scenario corresponding to the maximum TDP. For other workloads experienced during product operation by the end user, the offset between the die hot spot temperature and DTS temperature will be different than the one hard coded into the throttling algorithm. This can lead to potential undesirable early/late TCC activation depending on workload, and can impact customer performance (early activation) or possibly exceed maximum temperatures (late activation).

To guarantee the long term reliability of a processor, under fan failure or other anomalous thermal excursion, thermal throttling will kick-in to cool down the temperature of the processor. In one embodiment, the throttling circuit is activated depending upon the temperature recorded by the sensors (DTS) present at various locations on the chip. The maximum allowed temperature that any DTS can reach before a throttling controller (e.g., a throttling circuit) is activated is referred to herein as DTSmax and is calculated using equation (1).

$$\text{DTSmax} = T_j \text{ max} - \Psi_{jp} * TDP \qquad (1)$$

where DTSmax is the maximum temperature that any DTS can read before thermal throttling is activated. In other words, DTSmax operates as customer visible throttling temperature. $\Psi_{jp}$ is a measure of thermal resistance between the hot spot on the chip and the DTS. [what is Tjmax?] In one embodiment, this is determined by running well-known thermal simulations or experiments. TDP is the maximum power that a chip would see. The drawback of setting the DTSmax limits by this method is that it ignores the effect of the power map. Under actual use conditions, the temperature offset between the hot spot temperature and the DTS temperature is influenced heavily by the way the power is distributed on the chip by the specific workload.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
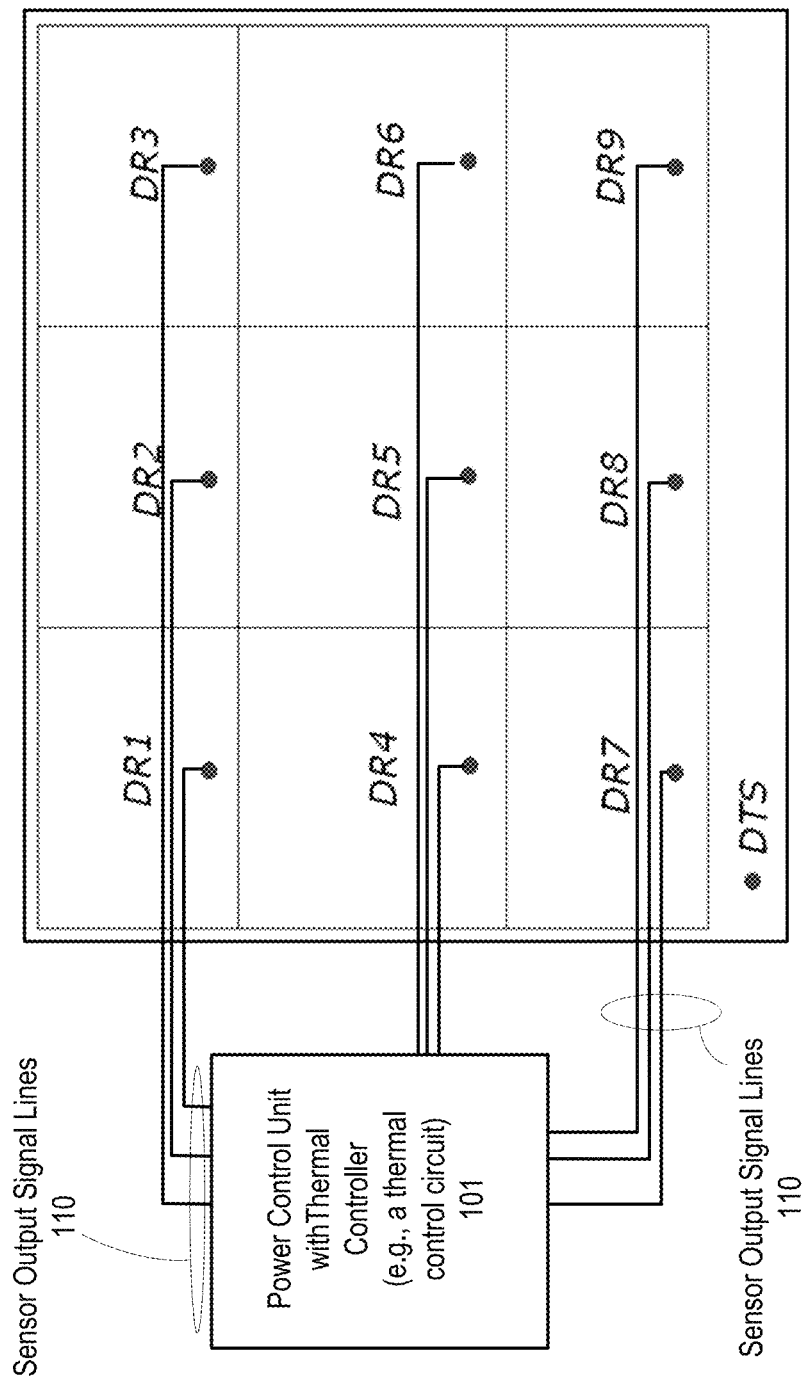
FIG. 1 illustrates locations of DTS relative to cores and input/output (TO) regions in one embodiment of an integrated circuit (IC).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Techniques are disclosed to adaptively change the thermal sensor maximum limit (e.g., digital thermal sensor DTSmax limit) used to control integrated circuit (IC) throttling by a thermal control circuit (TCC). In one embodiment, the DTSmax is changed adaptively based on changing workload scenarios. The adaptive changing of the DTSmax increases the accuracy of TCC triggering, thereby benefiting the customers as well as maintaining die temperature limits. Note that while digital thermal sensors (DTSs) are mentioned throughout the disclosure, the techniques herein are not limited to digital implementations of thermal sensors, and analog thermal sensors may be used.

A method and apparatus for adapting the value of DTSmax according to the workload is described below. In one embodiment, the value of the maximum allowed temperature (DTSmax) is updated for every DTS in real-time based on the power supplied to multiple functional blocks (e.g., processor cores, pipelines, IO register, or uncores, controllers, etc.). In one embodiment, these multiple functional blocks includes all the cores and input/output (TO) blocks of the IC. In one embodiment, these multiple function blocks includes all cores and IO blocks having a DTS. In another embodiment, these multiple functional blocks is a subset of the cores and/or IO blocks. This may result in less accuracy.

In one embodiment, the process for performing the update is based on the principle of thermal superposition in that the temperature difference between hot spot and a DTS caused by a workload is expressed as the superposition the temperature difference caused by every power source individually. One embodiment of the process presented herein sets a unique maximum allowed temperature limit on every DTS, depending upon its location on the chip relative to the heat producing sources, which is in contrast to imposing a single limit on all the DTSs.

An Example Process for Calculating DTSmax

In one embodiment, the process for calculating the individual DTSmax values is based on the principle of thermal superposition in that the temperature difference between hot spot and a DTS is expressed as the superposition of the temperature difference caused by every power source individually. In one embodiment, the temperature difference is expressed as a linear function of the power supplied to every power producing region on a die (e.g., core or IO regions), multiplied by appropriate weighting factors. For example, the temperature difference between the hot spot in Die Region #1 and the DTS located near Die Region #1 can be expressed as:

$$T_{DR1} - T_{DTS1} = w_1 P_{DR1} + w_2 P_{DR2} + \ldots w_n P_{DRn} \quad (2)$$

where
$T_{DR1}$=Maximum temperature in DR1
$T_{DTS1}$=Temperature recorded by DTS present in DR1.
$P_{DRi}$=Power supplied to Die Region #i (DRi)
$w_i$=Weighting factor assigned to power in DRi.
where i is an integer index for each of the units (e.g., cores) receiving power.

In one embodiment, the weighting factors reflect the relative impact of the power sources on the temperature difference between the core and DTS of interest. The value of a weighting factor depends upon the distance of the power source from the core and DTS of interest. In one embodiment, these values are obtained by running thermal models, which are well-known in the art. These include, for example, the finite difference method or the finite element method. In another embodiment, the values are obtained by running experiments and recording temperatures.

If the maximum allowed temperature in DR1 is known (referred to herein as $DR_{max}^1$), it is plugged into equation (1) to obtain the maximum allowed value temperature that for DTS #1 can reach (referred to herein $DTS_{max}^1$). This can be expressed as:

$$DTS_{max}^1 = DR_{max}^1 - w_1 P_{DR1} + w_2 P_{DR2} + \ldots w_n P_{DRn} \quad (3)$$

Thus, there is a relationship between the maximum allowed DTS temperature in a DR with the maximum allowed temperature in that DR and the power supplied to all the other DRs that is used to adapt the DTSmax. For a chip having n number of DTSs monitoring n number of cores, n such equations are used. These equations can be expressed compactly in matrix form as shown in below.

$$\begin{bmatrix} DTS_{max}^1 \\ DTS_{max}^2 \\ \vdots \\ DTS_{max}^{2n} \end{bmatrix} = \begin{bmatrix} DR_{max}^1 \\ DR_{max}^2 \\ \vdots \\ DR_{max}^{2n} \end{bmatrix} - \begin{bmatrix} w_1^1 & w_2^1 & \ldots & w_{1n}^1 \\ w_1^2 & w_2^2 & \ldots & w_n^2 \\ & & \vdots & \\ w_1^n & w_2^n & \ldots & w_n^n \end{bmatrix} \times \begin{bmatrix} P_{DR1} \\ P_{DR2} \\ \vdots \\ P_{DR3} \end{bmatrix}$$

In the above equation, the weighting factor matrix relates the impact of the power of every DR on the maximum allowed temperature for every DTS. In one embodiment, the weighting factor matrix is populated by running thermal simulations and can be hard coded into the throttling process (e.g., hardcoded in memory or firmware on the IC with the TCC or off-chip in a memory accessible by the IC. By monitoring the power to every DR, the maximum allowed DTS temperature (DTSmax) can be updated in real-time depending upon the workload. In one embodiment, this update occurs every clock cycle; however, it may be performed more or less often depending on a desired level of accuracy.

Case Study and Simulations to Quantify Impact of the Disclosed Techniques

The improvement of in the accuracy of calculating DTSmax using the techniques disclosed herein has been quantified on a processor power-map. However, the techniques are not limited to processors and can be installed for any integrated circuit (e.g., SOC, controller, etc.)

FIG. 1 is a block diagram of an IC. Referring to FIG. 1, IC 100 has eight DTS corresponding to nine power producing regions, labeled 1-9. In one embodiment, the DRs may include one or more processor cores and one or more IO regions. In one embodiment, IC 100 may comprise a processor, system on a chip (SOC), embedded controller, etc. Each of DRs 1-9 include a digital thermal sensor (DTS) which produces sensor output signal lines 110 which are sent to a power control unit (PCU) 101 with a thermal controller. In one embodiment, the thermal controller of PCU 101 includes a thermal control circuit.

Each of the thermal sensors is located in an area in the IC record the die temperature at a location in its associated area. In one embodiment, the thermal controller of PCU 101 compares each of the temperature readings received via the sensor output signal lines 110 from the DTSs of each of the cores and IO regions to the maximum temperature, DTSmax, associated with areas and performs thermal throttling of the IC to reduce its temperature based on results of the comparison. This occurs in response to the die temperature recorded by any one of the temperature sensors exceeding the individual temperature thresholds for that temperature sensor, where the individual temperature threshold for each temperature sensor is based on a maximum temperature allowed for the area in the IC in which the thermal sensor resides and the power supplied to all the areas or to multiple areas of the IC. In the case of FIG. 1, it's the power supplied to all of the DR regions 1-9 (e.g., cores, I/O regions, etc.).

In one embodiment, the individual temperature thresholds for each temperature sensor is based on the difference between the maximum temperature allowed for the area in the IC in which the thermal sensor resides and the power supplied to the multiple areas of the IC. In another embodiment, the individual temperature threshold for each temperature sensor is based on the difference between the maximum temperature allowed for the area in the IC in which the thermal sensor resides and a sum of a product of each power supplied to each DR area (e.g., the DR1-DR9 areas cores, I/O regions) and a weighting factor associated with each power supplied to each individual area.

In response to one of the recorded die temperatures from one of the DTSs being greater than its individual temperature threshold, the PCU 101 performs thermal throttling on IC 101. In one embodiment, the thermal throttling may comprise dynamic frequency and/or voltage scaling. In another embodiment, the thermal throttling may comprise clock modulation. In another embodiment, the thermal controller performs thermal throttling by sending control signals to each of the core to notify the cores to change power states to a lower power state in order to reduce the temperature of the IC. In one embodiment, the thermal controller generates one or more core/IO control signals 120 that are sent to individual core or I/O regions or to components supplying clock or voltage signals to those units to implement the temperature thermal throttling.

The impact of power in every core and IO on each of these ten DTSs may be quantified by running thermal models and the weighting factor matrix is populated. Note the maximum allowed DTS temperatures calculated using the algorithm disclosed herein are much more accurate than a prior art algorithm in use today.

Figure 2:
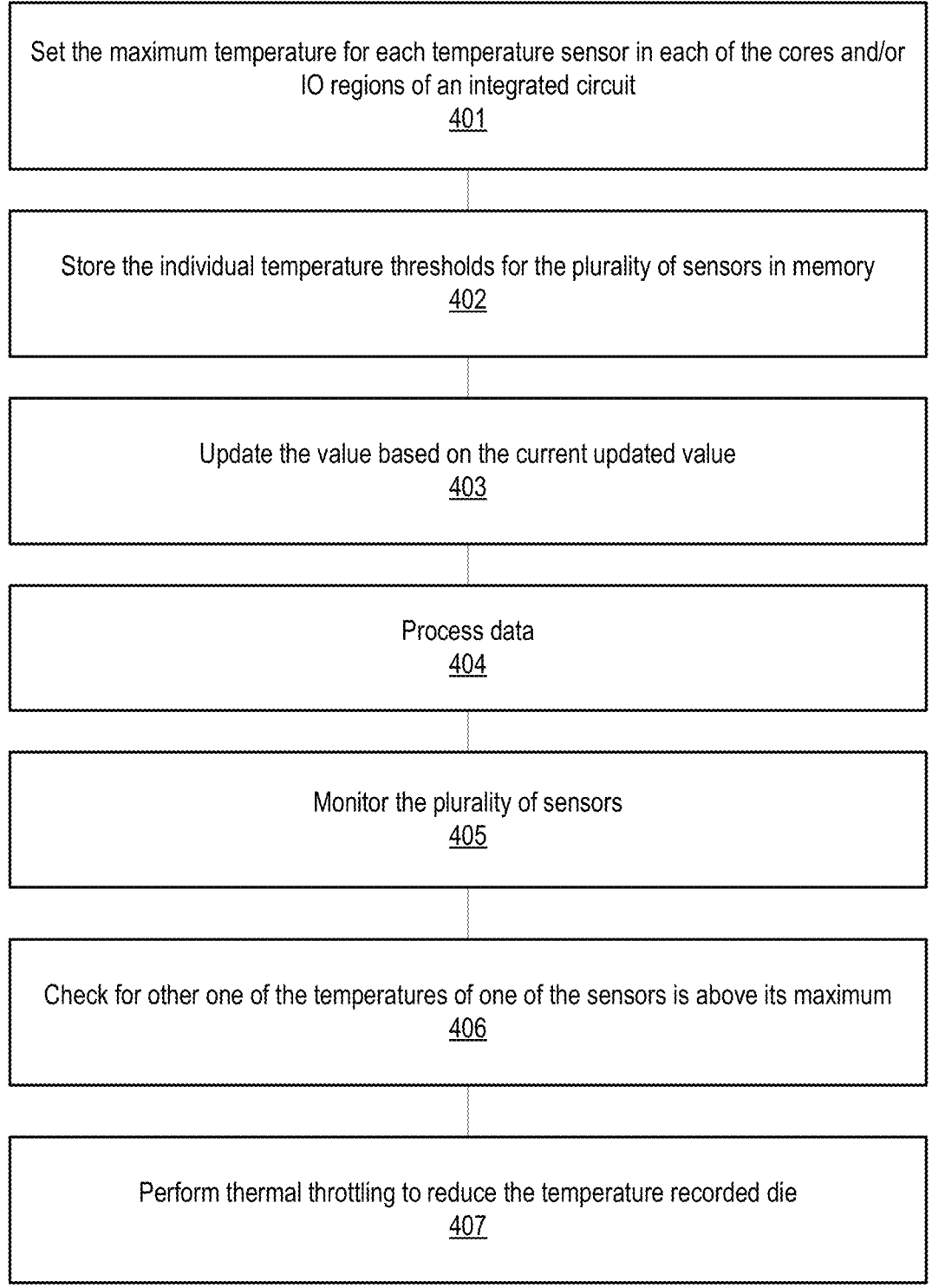
FIG. 2 illustrates a flow diagram of one embodiment of a process for performing thermal management of an integrated circuit (IC).

FIG. 2 illustrates a flow diagram of one embodiment of a process for performing thermal management of an integrated circuit (IC). The process is performed by processing logic that may comprise hardware (circuitry, dedicated logic, etc.), software (such as is run on a general purpose computer system or a dedicated machine), firmware, or a combination of the three.

Referring to FIG. 2, the process begins by setting the maximum temperature for each temperature sensor in each of the cores and/or IO regions of an integrated circuit (processing block 401). In one embodiment, this is performed by running thermal models on the IC. In one embodiment, this includes determining weighting factors associated with each of the power for each of the individual core and IO areas to set up a weighting factor matrix as discussed above. In one embodiment, the weighting factor matrix is populated by running thermal simulations in a manner well known in the art.

In one embodiment, the individual temperature threshold for each temperature sensor is based on the difference between the maximum temperature allowed for the area in the IC in which the thermal sensor resides and the power supplied to multiple areas of the IC. In one embodiment, the multiple areas of the IC include the areas of the core regions. In another embodiment, the areas include a subset of the cores. In yet another embodiment, the areas include the cores and one or more IO regions.

In one embodiment, processing logic stores the individual temperature thresholds for the plurality of sensors in memory (processing block 402).

After initial values have been set, processing logic may optionally update the value based on the current updated value (processing block 403). In one embodiment, the updating may be performed based on workload that is currently being performed by all the core regions. In one embodiment, this update occurs every clock cycle [any other time intervals?]

Then processing logic in the various cores and the IO regions processes data (processing block 404).

While processing data, processing monitors the plurality of sensors (processing block 405). This may occur in the thermal controller of a power control unit in the IC.

Processing logic checks for other one of the temperatures of one of the sensors is above its maximum (processing block 406). If not, processing logic continues transitions to processing block 404 where the processing logic continues to process data.

If the recorded temperature of one of the thermal sensors is greater than its associated maximum temperature, processing logic performs thermal throttling to reduce the temperature recorded die (processing block 407). In one embodiment, the thermal throttling comprises dynamic voltage and/or frequency scaling. In another embodiment, the thermal throttling includes performing clock modulation. In another embodiment, the thermal throttling comprises sending control signals to each core and/or IO unit to signal the unit to change its power state to a lower power state in an attempt to reduce the core temperature of the die.

Figure 3:
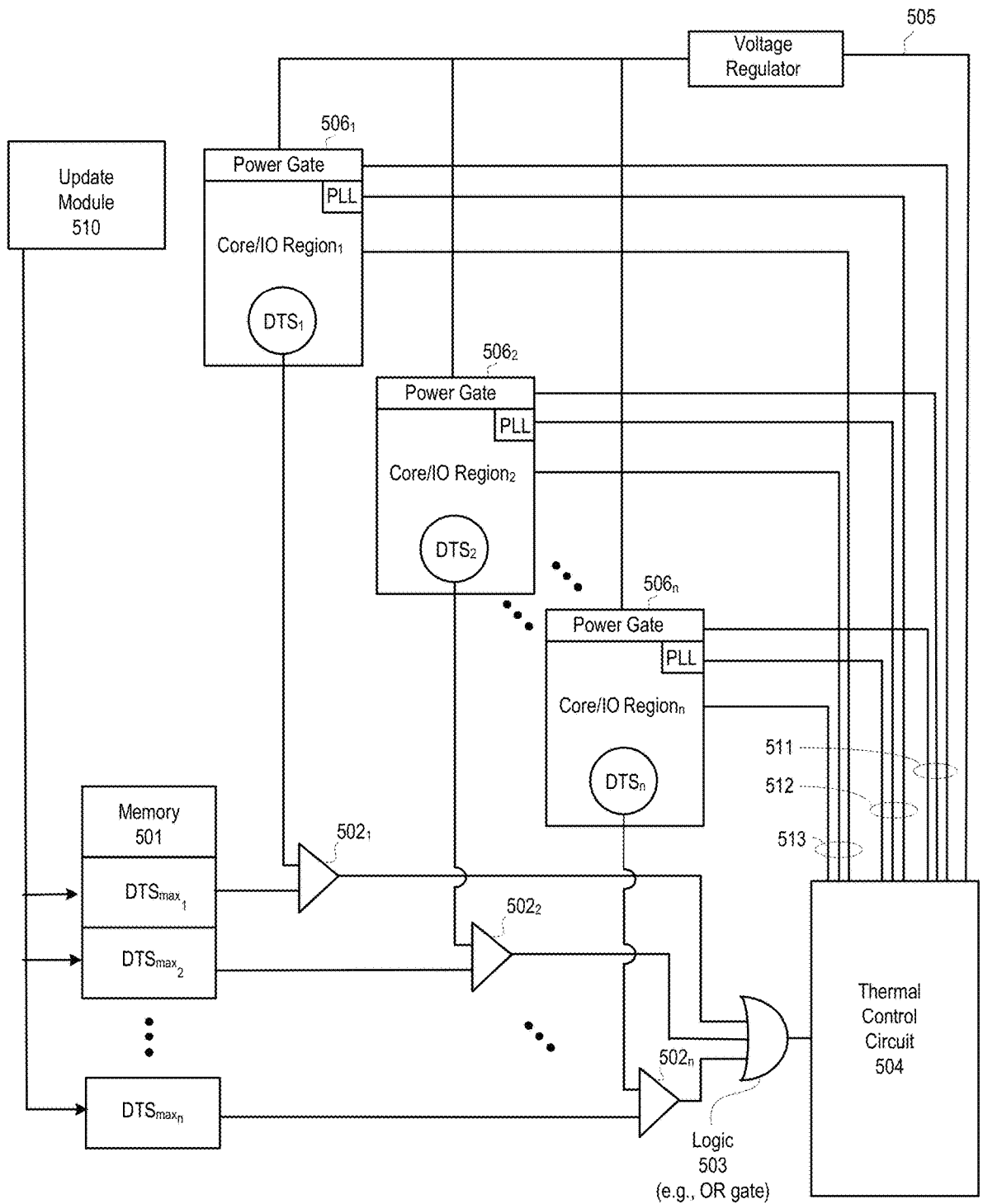
FIG. 3 illustrates a more detailed view of one embodiment of a power delivery system.

FIG. 3 illustrates a more detailed view of the power delivery system. Referring to FIG. 3, memory 501 stores the maximum temperatures for each of the monitored areas (e.g., an area having a DTS) of the IC. In one embodiment, the monitored areas include the cores and IO regions. In another embodiment, the monitored regions include a subset of all the cores and IO regions. The digital eye temperature sensor (e.g., DTS) for each of the cores/IO regions provide a temperature that is compared against its maximum using comparators 502. Logic 503 (e.g., gate logic) receives the results of each of the comparisons and if any of the comparisons indicates that a die temperature for one of the regions for one of the areas is greater than its associated maximum temperature threshold, thermal control circuit 504 performs thermal throttling. The thermal throttling may include sending control signals 510 signals to a voltage regulator (VR) 505 that's providing voltage to each of the core and IO regions. In another embodiment, the thermal throttling may include sending voltage control signals 511 to power gates (e.g., $506_1$-$506_n$ associated with each of the core regions. And in yet another embodiment, thermal control current 504 sends signals 512 to a clock generator (e.g., phase lock loop (PLL)) in each of the core and IO regions to control the clock signals that is generated in order to perform frequency scaling in the respective core/IO region. In still another embodiment, thermal control circuit 504 sends control signals 523 (e.g., power state change control signals) to the cores/IO regions to cause these units to reduce power consumption (e.g., change to a lower power state) to achieve thermal throttling.

An update module 510 updates the maximum individual temperature thresholds for each of the temperature sensors if the power supplied to those areas changes, the power may be supplied based on changes in workload associated with that individual core/I/O region.

The techniques described herein allow for more effective throttling. This improves the product performance (by avoiding over throttling) and also its reliability (by avoiding under-throttling).

Figure 4:
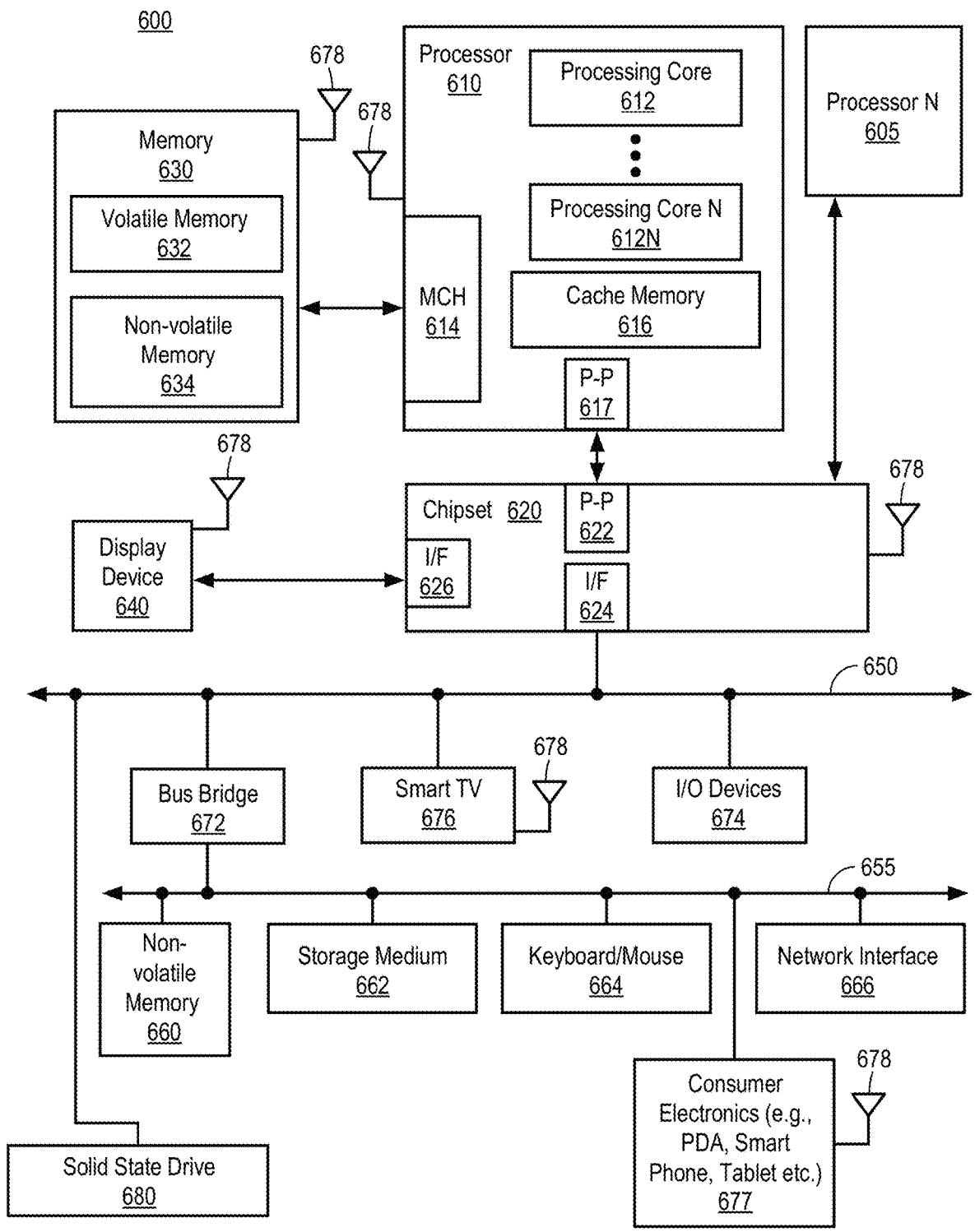
FIG. 4 is one embodiment of a computing system.

FIG. 4 is one embodiment of a system level diagram 600 that may incorporate the techniques described above. For example, the techniques described above may be incorporated into a processor in system 600.

Referring to FIG. 4, system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 600 implements the methods disclosed herein and may be a system on a chip (SOC) system.

In one embodiment, processor 610 has one or more processor cores 612 to 612N, where 612N represents the Nth processor core inside the processor 610 where N is a positive integer. In one embodiment, system 600 includes multiple processors including processors 610 and 605, where processor 605 has logic similar or identical to logic of processor 610. In one embodiment, system 600 includes multiple processors including processors 610 and 605 such that processor 605 has logic that is completely independent from the logic of processor 610. In such an embodiment, a multi-package system 600 is a heterogeneous multi-package system because the processors 605 and 610 have different logic units. In one embodiment, processing core 612 includes, but is not limited to, pre-fetch logic to fetch instructions, decode logic to decode the instructions, execution logic to execute instructions and the like. In one embodiment, processor 610 has a cache memory 616 to cache instructions and/or data of the system 600. In another embodiment of the invention, cache memory 616 includes level one, level two and level three, cache memory, or any other configuration of the cache memory within processor 610.

In one embodiment, processor 610 includes a memory control hub (MCH) 614, which is operable to perform functions that enable processor 610 to access and communicate with a memory 630 that includes a volatile memory 632 and/or a non-volatile memory 634. In one embodiment, memory control hub (MCH) 614 is positioned outside of processor 610 as an independent integrated circuit.

In one embodiment, processor 610 is operable to communicate with memory 630 and a chipset 620. In such an embodiment, SSD 680 executes the computer-executable instructions when SSD 680 is powered up.

In one embodiment, processor 610 is also coupled to a wireless antenna 678 to communicate with any device configured to transmit and/or receive wireless signals. In one embodiment, wireless antenna interface 678 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 634 includes, but is not limited to, flash memory (e.g., NAND, NOR), phase change memory (PCM), read-only memory (ROM), electrically erasable programmable read-only memory (EEPROM), or any other type of non-volatile memory device.

Memory 630 stores information and instructions to be executed by processor 610. In one embodiment, chipset 620 connects with processor 610 via Point-to-Point (PtP or P-P) interfaces 617 and 622. In one embodiment, chipset 620 enables processor 610 to connect to other modules in the system 600. In one embodiment, interfaces 617 and 622 operate in accordance with a PtP communication protocol such as the Intel QuickPath Interconnect (QPI) or the like.

In one embodiment, chipset 620 is operable to communicate with processor 610, 605, display device 640, and other devices 672, 676, 674, 660, 662, 664, 666, 677, etc. In one embodiment, chipset 620 is also coupled to a wireless antenna 678 to communicate with any device configured to transmit and/or receive wireless signals.

In one embodiment, chip set 620 connects to a display device 640 via an interface 626. In one embodiment, display device 640 includes, but is not limited to, liquid crystal display (LCD), plasma, cathode ray tube (CRT) display, or any other form of visual display device. In addition, chipset 620 connects to one or more buses 650 and 655 that interconnect various modules 674, 660, 662, 664, and 666. In one embodiment, buses 650 and 655 may be interconnected together via a bus bridge 672 if there is a mismatch in bus speed or communication protocol. In one embodiment, chipset 620 couples with, but is not limited to, a non-volatile memory 660, a mass storage device(s) 662, a keyboard/mouse 664, and a network interface 666 via interface 624, smart TV 676, consumer electronics 677, etc.

In one embodiment, mass storage device 662 includes, but is not limited to, a solid state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 4 are depicted as separate blocks within the system 600, the functions performed by some of these blocks may be integrated within a single semiconductor circuit or may be implemented using two or more separate integrated circuits.

In a first example embodiment, an apparatus to control temperature of an integrated circuit (IC) comprises a plurality of thermal sensors, each of the plurality of thermal sensors being located in an area in the IC to record a die temperature at a location in its associated area; and a thermal controller coupled to the plurality of thermal sensors to perform thermal throttling of the IC to reduce the temperature of the IC in response to the die temperature recorded by any one temperature sensors of the plurality of thermal sensors being greater than an individual temperature threshold for said any one temperature sensor, where the individual temperature threshold for each temperature sensor is based on a maximum temperature allowed for the area in the IC in which said each thermal sensor is located and power supplied to a plurality of areas of the IC.

In another example embodiment, the subject matter of the first example embodiment can optionally include that the individual temperature threshold for each temperature sensor is based on a difference between the maximum temperature allowed for the area in the IC in which said each thermal sensor is located and power supplied to the plurality of areas of the IC.

In another example embodiment, the subject matter of the first example embodiment can optionally include that the individual temperature threshold for each temperature sensor is based on a difference between the maximum temperature allowed for the area in the IC in which said each thermal sensor is located and a sum of a product of each power supplied to each area of the plurality of areas and a weighting factor associated with said each power supplied to each area.

In another example embodiment, the subject matter of the first example embodiment can optionally include: a memory to store the individual temperature thresholds for the plurality of sensors; and an update module coupled to the memory to update the individual temperature threshold for each of the plurality of temperature sensors if the power supplied to one or more areas of the plurality of areas changes. In another example embodiment, the subject matter of this example embodiment can optionally include that the update module monitors changes to the power supplied to one or more areas of the plurality of areas changes.

In another example embodiment, the subject matter of the first example embodiment can optionally include that the thermal throttling is operable to cause dynamic frequency scaling to reduce the temperature of the IC.

In another example embodiment, the subject matter of the first example embodiment can optionally include that the thermal throttling comprises clock modulation.

In a second example embodiment, a method for controlling temperature of an integrated circuit (IC) comprises: monitoring a plurality of thermal sensors, each of the plurality of thermal sensors being located in an area in the IC to record a die temperature at a location in its associated area; and performing thermal throttling of the IC to reduce the temperature of the IC in response to the die temperature recorded by any one temperature sensors of the plurality of thermal sensors being greater than an individual temperature threshold for said any one temperature sensor, the individual temperature threshold for each temperature sensor being based on a maximum temperature allowed for the area in the IC in which said each thermal sensor is located and power supplied to a plurality of areas of the IC.

In another example embodiment, the subject matter of the second example embodiment can optionally include that the individual temperature threshold for each temperature sensor is based on a difference between the maximum temperature allowed for the area in the IC in which said each thermal sensor is located and power supplied to the plurality of areas of the IC.

In another example embodiment, the subject matter of the second example embodiment can optionally include that the individual temperature threshold for each temperature sensor is based on a difference between the maximum temperature allowed for the area in the IC in which said each thermal sensor is located and a sum of a product of each power supplied to each area of the plurality of areas and a weighting factor associated with said each power supplied to each area.

In another example embodiment, the subject matter of the second example embodiment can optionally include: storing the individual temperature thresholds for the plurality of sensors in memory; and updating the individual temperature threshold for each of the plurality of temperature sensors if the power supplied to one or more areas of the plurality of areas changes. In another example embodiment, the subject matter of this example embodiment can optionally include that updating the individual temperature threshold for each of the plurality of temperature sensors includes monitoring changes to the power supplied to one or more areas of the plurality of areas changes.

In another example embodiment, the subject matter of the second example embodiment can optionally include that the thermal throttling is operable to cause dynamic frequency scaling to reduce the temperature of the IC.

In another example embodiment, the subject matter of the second example embodiment can optionally include that the thermal throttling comprises clock modulation.

In a third example embodiment, a computing system comprises: a memory to store the individual temperature thresholds for the plurality of sensors in memory; a display coupled to the memory; a processor coupled to the memory and the display, the processor comprising a plurality of thermal sensors, each of the plurality of thermal sensors being located in an area in the IC to record a die temperature at a location in its associated area; and a thermal controller coupled to the plurality of thermal sensors to perform thermal throttling of the IC to reduce the temperature of the IC in response to the die temperature recorded by any one temperature sensors of the plurality of thermal sensors being greater than an individual temperature threshold for said any one temperature sensor, where the individual temperature threshold for each temperature sensor is based on a maximum temperature allowed for the area in the IC in which said each thermal sensor is located and power supplied to a plurality of areas of the IC.

In another example embodiment, the subject matter of the third example embodiment can optionally include that the individual temperature threshold for each temperature sensor is based on a difference between the maximum temperature allowed for the area in the IC in which said each thermal sensor is located and power supplied to the plurality of areas of the IC.

In another example embodiment, the subject matter of the third example embodiment can optionally include that the individual temperature threshold for each temperature sensor is based on a difference between the maximum temperature allowed for the area in the IC in which said each thermal sensor is located and a sum of a product of each power supplied to each area of the plurality of areas and a weighting factor associated with said each power supplied to each area.

In another example embodiment, the subject matter of the third example embodiment can optionally include an update module coupled to the processor to update the individual temperature thresholds for each of the plurality of temperature sensors if the power supplied to one or more areas of the plurality of areas changes. In another example embodiment, the subject matter of this example embodiment can optionally include that the update module monitors changes to the power supplied to one or more areas of the plurality of areas changes.

In another example embodiment, the subject matter of the third example embodiment can optionally include that the thermal throttling is operable to cause dynamic frequency scaling to reduce the temperature of the IC.

In another example embodiment, the subject matter of the third example embodiment can optionally include that the thermal throttling comprises clock modulation.

In a fourth example embodiment, a machine-readable medium has instructions that when operated on by the machine cause the machine to perform operations comprising: receiving recorded die temperatures from a plurality of thermal sensors being monitored, each of the plurality of thermal sensors being located in an area in an IC to record a die temperature at a location in its associated area; and sending commands to perform thermal throttling of the IC to reduce the temperature of the IC in response to the die temperature recorded by any one temperature sensors of the plurality of thermal sensors being greater than an individual temperature threshold for said any one temperature sensor, where the individual temperature threshold for each temperature sensor is based on a maximum temperature allowed for the area in the IC in which said each thermal sensor is located and power supplied to a plurality of areas of the IC.

In another example embodiment, the subject matter of the fourth example embodiment can optionally include that the individual temperature threshold for each temperature sensor is based on a difference between the maximum temperature allowed for the area in the IC in which said each thermal sensor is located and power supplied to the plurality of areas of the IC.

In another example embodiment, the subject matter of the fourth example embodiment can optionally include that the individual temperature threshold for each temperature sensor is based on a difference between the maximum temperature allowed for the area in the IC in which said each thermal sensor is located and a sum of a product of each power supplied to each area of the plurality of areas and a weighting factor associated with said each power supplied to each area.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A processor comprising:
a plurality of thermal sensors distributed in the processor, wherein an individual thermal sensor has an individual temperature threshold; and
a controller coupled to the thermal sensors, wherein the controller is to adaptively modify the individual temperature threshold according to workload executed by the processor, and wherein the controller is to adaptively modify the individual temperature threshold during respective ones of a plurality of successive clock cycles.

2. The processor of claim 1, wherein the controller is to perform thermal throttling of the processor in response to a temperature recorded by any one of the thermal sensors of the plurality of thermal sensors being greater than the individual temperature threshold.

3. The processor of claim 1, wherein the plurality of thermal sensors is distributed in multiple functional blocks including processor cores, pipelines, I/O blocks, and uncore.

4. The processor of claim 1, wherein the individual temperature threshold is based on a maximum temperature allowed for an area of the processor.

5. The processor of claim 4, wherein the individual temperature threshold for each thermal sensor is based on a difference between the maximum temperature allowed for the area in the processor and a power supplied to a plurality of areas of the processor.

6. The processor of claim 4, wherein the individual temperature threshold for each thermal sensor is based on a difference between the maximum temperature allowed for the area in the processor in which said each thermal sensor is located and a sum of a product of each power supplied to each area of a plurality of areas of the processor and a weighting factor associated with said each power supplied to each area.

7. The processor of claim 6, wherein the weighting factor depends upon a distance of a power source from a functional block and the individual thermal sensor.

8. The processor of claim 6, wherein the weighting factor is stored in memory.

9. The processor of claim 1 comprising memory to store the individual temperature threshold.

10. The processor of claim 9 comprising a circuitry to update the individual temperature threshold stored in the memory.

11. The processor of claim 1 wherein the controller is to cause dynamic frequency scaling to perform thermal throttling of the processor.

12. A machine-readable media having machine-readable instructions stored thereon, that when executed, cause one or more machines to perform a method comprising:
adaptively modifying an individual temperature threshold of an individual thermal sensor according to workload executed by a processor, wherein the individual thermal sensor is from a plurality of thermal sensors distributed in the processor; wherein
the individual temperature threshold for the individual thermal sensor is modified based on a difference between the maximum temperature allowed for an area in which the thermal sensor is located and a parameter related to power supplied to a plurality of areas of the processor.

13. The machine-readable media of claim 12, wherein adaptively modifying the individual temperature threshold comprises modifying the individual temperature threshold in real-time.

14. The machine-readable media of claim 12, wherein adaptively modifying the individual temperature threshold comprises modifying the individual temperature threshold every clock cycle.

15. The machine-readable media of claim 12 having machine-readable instructions stored thereon, that when executed, cause the one or more machines to perform the method comprising performing thermal throttling of the processor in response to a temperature recorded by any one of the thermal sensors of the plurality of thermal sensors being greater than the individual temperature threshold.

16. A system comprising:
a memory;
a processor coupled to the memory; and
a wireless interface to allow the processor to communicate with another device, wherein the processor includes:
a plurality of thermal sensors distributed in the processor, wherein an individual thermal sensor has an individual temperature threshold; and
a controller coupled to the thermal sensors, wherein the controller is to adaptively modify the individual temperature threshold according to workload executed by the processor;
wherein the individual temperature threshold for the individual thermal sensor is modified based on a difference between the maximum temperature allowed for an area in which the thermal sensor is located and a parameter related to power supplied to a plurality of areas of the processor.

17. The system of claim 16, wherein the controller is to adaptively modify the individual temperature threshold in real-time.

18. The system of claim 16, wherein the controller is to adaptively modify the individual temperature threshold every clock cycle.

19. The system of claim 16, wherein the controller is to perform thermal throttling of the processor in response to a temperature recorded by any one of the thermal sensors of the plurality of thermal sensors being greater than the individual temperature threshold.

20. The system of claim 16, wherein the plurality of thermal sensors is distributed in multiple functional blocks including processor cores, pipelines, I/O blocks, and uncore.

21. The system of claim 16, wherein the parameter is a power supplied to a plurality of areas of the processor.

22. The system of claim 16, wherein the parameter is a sum of a product of each power supplied to each area of a plurality of areas of the processor and a weighting factor associated with said each power supplied to each area.

* * * * *